United States Patent
Yamada

(10) Patent No.: US 9,013,725 B2
(45) Date of Patent: Apr. 21, 2015

(54) COMPUTER-READABLE STORAGE MEDIUM STORING DRIVER MANAGEMENT PROGRAM, COMPUTER-READABLE STORAGE MEDIUM STORING UNINSTALLATION PROGRAM AND INFORMATION PROCESSING DEVICE

(71) Applicant: Jun Yamada, Nagoya (JP)

(72) Inventor: Jun Yamada, Nagoya (JP)

(73) Assignee: Brother Kogyo Kabushiki Kaisha, Nagoya-Shi, Aichi-Ken (JP)

(*) Notice: Subject to any disclaimer, the term of this patent is extended or adjusted under 35 U.S.C. 154(b) by 0 days.

(21) Appl. No.: 13/780,919

(22) Filed: Feb. 28, 2013

(65) Prior Publication Data
US 2013/0235404 A1    Sep. 12, 2013

(30) Foreign Application Priority Data

Mar. 7, 2012   (JP) .................................. 2012-050408
Oct. 10, 2012  (JP) .................................. 2012-224787

(51) Int. Cl.
    *G06F 3/12*    (2006.01)

(52) U.S. Cl.
    CPC .............. *G06F 3/1225* (2013.01); *G06F 3/122* (2013.01); *G06F 3/1285* (2013.01)

(58) Field of Classification Search
    CPC ..... G06F 3/1225; G06F 3/122; G06F 3/1228; G06F 3/1205; G06F 3/1224; G06F 3/1254
    See application file for complete search history.

(56) References Cited

U.S. PATENT DOCUMENTS

| | | | |
|---|---|---|---|
| 6,789,111 B1* | 9/2004 | Brockway et al. ............ | 709/222 |
| 7,681,205 B2* | 3/2010 | Chihara ........................ | 719/327 |
| 8,223,363 B2* | 7/2012 | Selvaraj ....................... | 358/1.15 |
| 8,786,869 B2* | 7/2014 | Araki ........................... | 358/1.13 |
| 8,848,217 B2* | 9/2014 | Kobayashi ................... | 358/1.15 |
| 2003/0174347 A1* | 9/2003 | Gonzalez et al. ............. | 358/1.6 |
| 2004/0210897 A1* | 10/2004 | Brockway et al. ............ | 717/174 |
| 2005/0157321 A1* | 7/2005 | Alacar ......................... | 358/1.13 |
| 2005/0162678 A1* | 7/2005 | Nakata ......................... | 358/1.13 |
| 2005/0162688 A1* | 7/2005 | Nakaoka et al. ............. | 358/1.15 |

(Continued)

FOREIGN PATENT DOCUMENTS

| | | | | |
|---|---|---|---|---|
| JP | 10-171617 A | | 6/1998 | |
| JP | 10171617 A | * | 6/1998 | ................ G06F 3/12 |

(Continued)

OTHER PUBLICATIONS

David Kappos, Subject Matter Eligibility of Computer Readable Media, US Patent and Trademark Office, Feb. 23, 2010, 1351 OG 212.*

*Primary Examiner* — King Poon
*Assistant Examiner* — Ted Barnes
(74) *Attorney, Agent, or Firm* — Scully, Scott, Murphy & Presser, P.C.

(57) ABSTRACT

Devices, methods and programs for installing and uninstalling drivers are provided. For example, a computer-readable storage medium stores a driver management program. The driver management program that, when executed by a processor, may cause the processor to execute receiving an instruction to control an image processing device, downloading a driver program from an external device when the instruction is received installing the driver program for controlling the image processing device in a storage device coupled to processor and starting up the installed driver program.

16 Claims, 6 Drawing Sheets

(56) References Cited

U.S. PATENT DOCUMENTS

| | | | |
|---|---|---|---|
| 2005/0180793 A1* | 8/2005 | Nishiguchi | 400/76 |
| 2005/0210480 A1* | 9/2005 | Chihara | 719/321 |
| 2006/0146368 A1* | 7/2006 | Uchida | 358/1.15 |
| 2007/0019229 A1* | 1/2007 | Matsuhara | 358/1.15 |
| 2008/0015918 A1* | 1/2008 | Pangrazio et al. | 705/8 |
| 2008/0079991 A1* | 4/2008 | Horikoshi et al. | 358/1.15 |
| 2008/0155531 A1* | 6/2008 | Yamada | 717/174 |
| 2009/0300659 A1* | 12/2009 | Asai | 719/321 |
| 2009/0300661 A1* | 12/2009 | Asai | 719/327 |
| 2010/0002253 A1* | 1/2010 | Kim et al. | 358/1.15 |
| 2010/0033757 A1* | 2/2010 | Saito | 358/1.15 |
| 2010/0070969 A1* | 3/2010 | Brockway et al. | 717/176 |
| 2011/0075207 A1* | 3/2011 | Nakata | 358/1.15 |
| 2011/0222096 A1* | 9/2011 | Natori | 358/1.13 |
| 2011/0261396 A1* | 10/2011 | Takahashi | 358/1.15 |
| 2012/0026551 A1* | 2/2012 | Tarumi | 358/1.15 |
| 2012/0081737 A1* | 4/2012 | Pandit | 358/1.15 |
| 2012/0092693 A1* | 4/2012 | Jaudon et al. | 358/1.13 |
| 2012/0092721 A1* | 4/2012 | Jaudon et al. | 358/1.15 |

FOREIGN PATENT DOCUMENTS

| | | |
|---|---|---|
| JP | 2005-115440 A | 4/2005 |
| JP | 2005-267089 A | 9/2005 |
| JP | 2007-026377 A | 2/2007 |

* cited by examiner

COMPUTER-READABLE STORAGE MEDIUM STORING DRIVER MANAGEMENT PROGRAM, COMPUTER-READABLE STORAGE MEDIUM STORING UNINSTALLATION PROGRAM AND INFORMATION PROCESSING DEVICE

CROSS-REFERENCE TO RELATED APPLICATION

This application claims priority from Japanese Patent Application No. 2012-050408 filed on Mar. 7, 2012, and No. 2012-224787 filed on Oct. 10, 2012. The entire content of each of these priority applications is incorporated herein by reference.

FIELD OF DISCLOSURE

The disclosure relates to installing a driver program by downloading the driver program from an external device and selectively uninstalling a driver program.

BACKGROUND

In a known driver managing method, a change of a network environment is monitored. An output device connected to a network is detected when connection to the network has been confirmed under monitoring. A driver corresponding to the detected output device is installed.

However, in the known method, the driver is installed when the connection to the network has been confirmed. Therefore, the driver may be installed even when the output device is not used. In other words, a driver that will not be used may be installed.

SUMMARY

Aspects of the disclosure relate to a computer-readable storage medium storing a driver management program. The driver management program that, when executed by a processor, causes the processor to execute receiving an instruction to control an image processing device, downloading a driver program from an external device when the instruction is received installing the driver program for controlling the image processing device in a storage device coupled to processor and starting up the installed driver program.

Aspects of the disclosure relate to an information processing device which includes a storage device and a controller. The controller is configured to receive an instruction to control an image processing device, download a driver program from an external device when the instruction is received, install the driver program for controlling the image processing device in the storage device and start up the installed driver program. Aspects of the disclosure relate to a computer-readable storage medium storing an uninstallation program. The uninstallation program, when executed by a processor coupled to a storage device configured to store a driver program, causes the processor to execute determining whether an available space of the storage device is equal to or greater than a driver uninstallation reference value and selecting the driver program stored in the storage device when it is determined that the available space is less than the driver uninstallation reference value. The uninstallation program when executed by the processor, further causes the processor to execute obtaining device information representing an image processing device associated with the selected driver program, uninstalling the driver program and associating the obtained device information with a driver management program which receives an instruction to control the image processing device.

DETAILED DESCRIPTION

Figure 1:
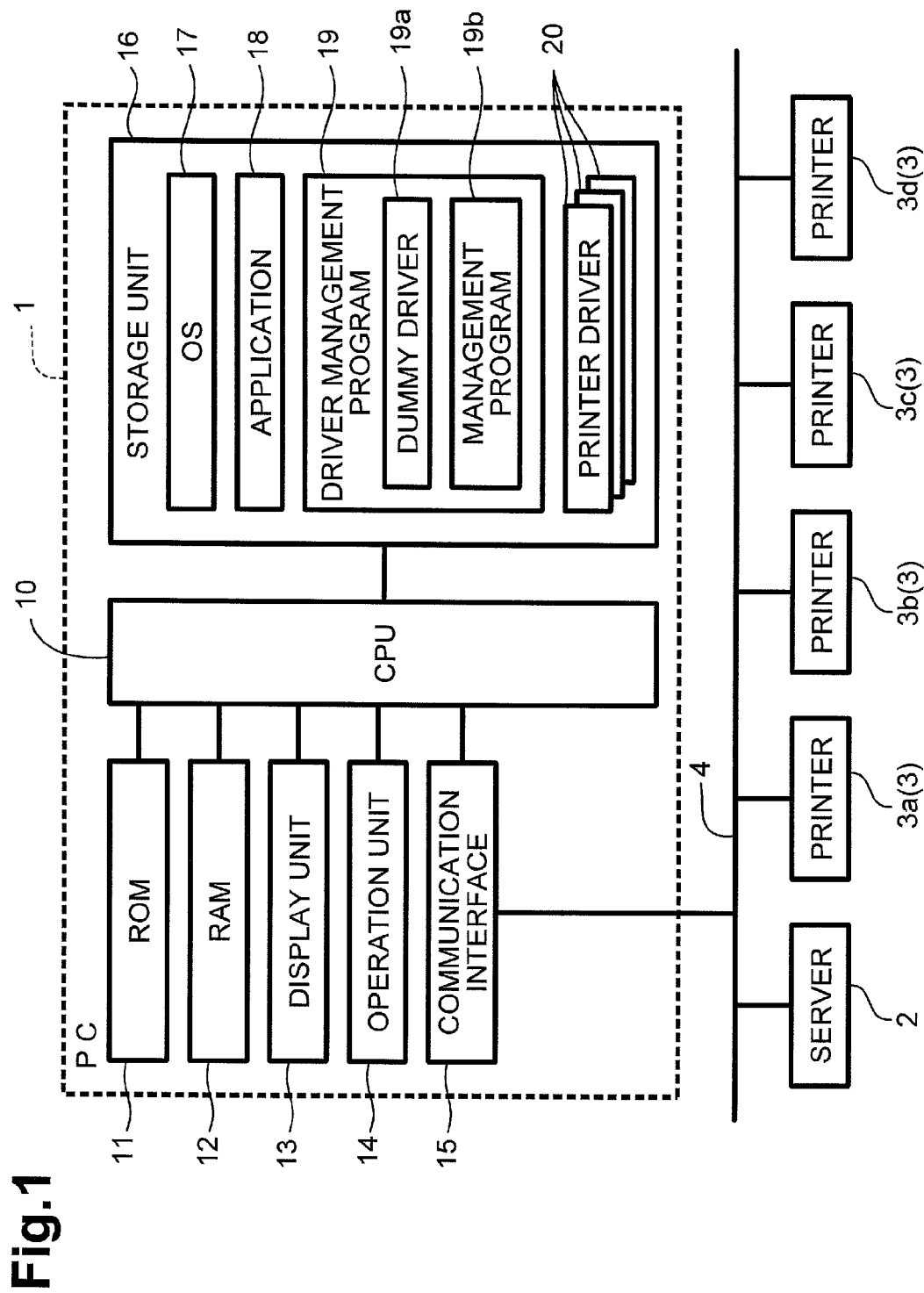
FIG. 1 is a block diagram depicting electrical configuration of a system according to one or more aspects of the invention.

Embodiments are described in detail herein with reference to the accompanying drawings, like reference numerals being used for like corresponding parts in the various drawings.

(1) Electrical Configuration of Personal Computer

A personal computer (PC) 1 may be communicatively connected to an external device, e.g., a server 2, and image processing devices and output devices, e.g., printers 3a-3d, via a communication network 4, e.g., a local area network (LAN) or the Internet. The PC 1 may make wireless connection to the LAN or the Internet or may make wired connection to the LAN or the Internet by a communication cable.

The server 2 stores printer drivers according to models of the printers 3a-3d. The printers 3a-3d may be of all different models. Hereinafter, any one of the printers 3a-3d may be referred to as "the printer 3" and all printers 3a-3d may be collectively referred to as "the printers 3."

The PC 1 comprises a central processing unit (CPU) 10, a read-only memory (ROM) 11, a random access memory (RAM) 12, a display unit 13, an operation unit 14, a connecting portion, e.g., a communication interface 15, and a storage unit 16.

The CPU 10 is configured to controls components of the PC 1 by executing programs stored in the ROM 11 and the storage unit 16. The ROM 11 stores data and programs that may be executed by the CPU 10. The RAM 12 may be used as a primary storage device for the CPU 10 to execute various processing.

The display unit 13 comprises a display device, e.g. a liquid crystal display, and a driving circuit configured to drive the display device.

The operation unit 14 comprises a keyboard, a mouse, and an interface connected to the keyboard and the mouse, or a touch panel that may cover a display surface of the display device.

The communication interface 15 may be connected to the server 2 and the printers 3, via the communication network 4, to make transmission and reception of data between the server 2 and the printers 3. The communication interface 15 may comprise a plurality of interfaces. For example, when the server 2 and the PC 1 are connected by the Internet, and the printer 3 and the PC 1 are connected by the LAN, the communication interface 15 may be provided for each communication network 4. When the server 2 and the PC 1 are connected by the Internet, and the printer 3 and the PC 1 are connected by the LAN, the server 2 and the PC 1 may be connected by the Internet via the LAN.

The storage unit 16 is configured to store various programs and data using a nonvolatile memory, e.g., a hard disk or a flash memory.

(2) Software Structure of Personal Computer

As depicted in FIG. 1, the storage unit 16 stores (or is configured to store) an operating system (OS) 17, an application program (hereinafter, simply referred to as the application) 18, a driver management program 19 as a driver management program and an uninstallation program according to an embodiment, and printer drivers 20 according to models of the printers 3a-3d.

The OS 17 may be, for example, Microsoft WINDOWS (registered trademark). However, the OS 17 may not be limited to Microsoft WINDOWS (registered trademark).

The application 18 may be an any program, e.g., word processor or spreadsheet program, that may have a function to output data to be printed to the printer driver 20, via the OS 17.

The printer driver 20 is a driver program for controlling the printer 3. The printer driver 20 has a plurality of functions, including, but not limited to, for example, displaying a print properties dialog box 51, to provide an application program interface (API) to the OS 17, and control the printer 3.

The driver management program 19 is configured to monitor a space available in the storage unit 16 and to uninstall the printer driver 20 when a space available in the storage unit 16 is reduced, to increase a space for other data to be stored.

If the printer driver 20 is uninstalled, the printer 3 controlled by the printer driver 20 that is uninstalled, may not be able to perform printing. Therefore, the driver management program 19 receives a print instruction from the application 18, instead of the uninstalled printer driver 20. As the driver management program 19 receives a print instruction from the application 18, the driver management program 19 downloads the relevant printer driver 20 from the server 2 to install the printer driver 20 in the PC 1. The driver management program 19 is configured to start up the installed printer driver 20 to control the printer 3.

(3) Module Structure of Printer Driver

Figure 2:
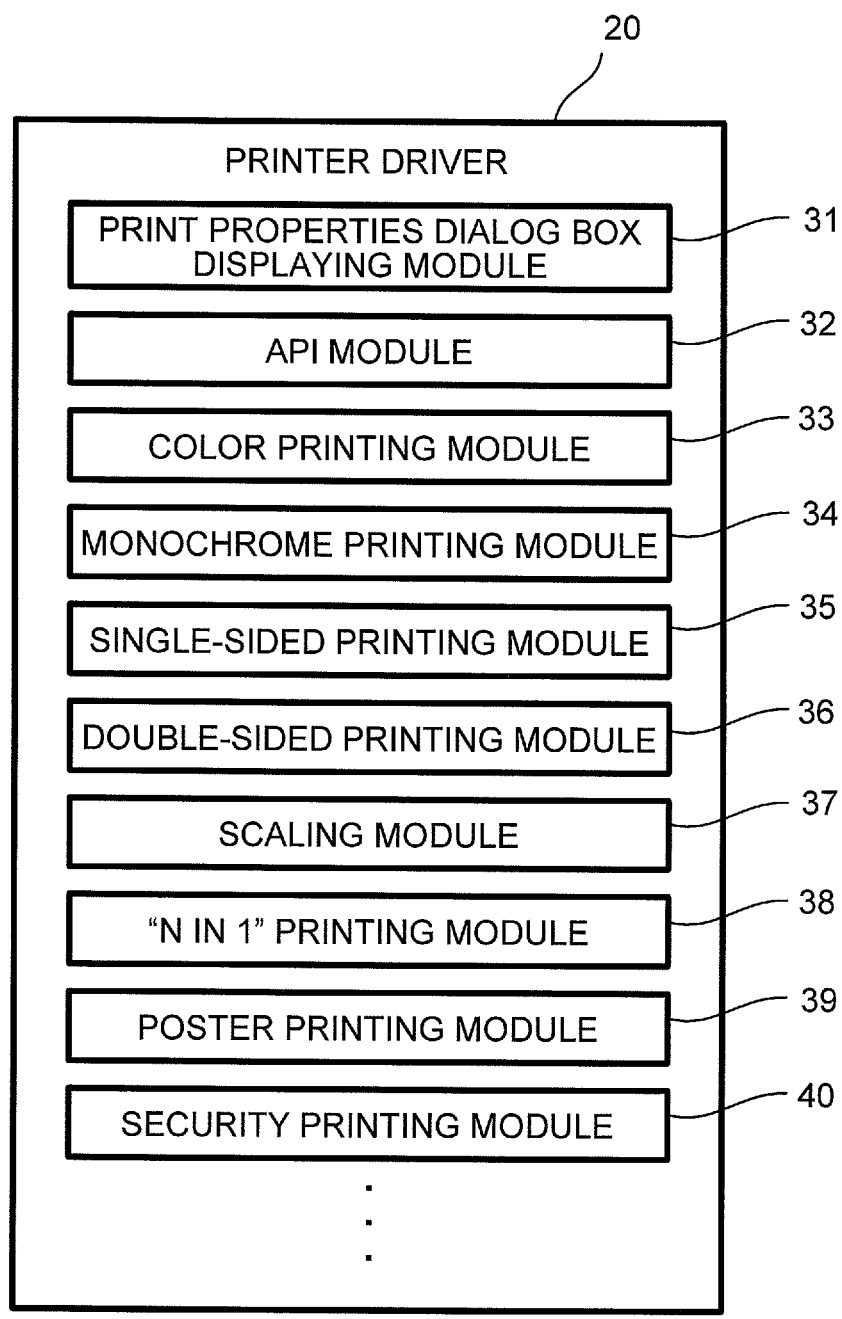
FIG. 2 is a diagram depicting a module structure of a printer driver.

As depicted in FIG. 2, the printer driver 20 may comprise a plurality of modules.

A print properties dialog box displaying module 31 is configured to display the print properties dialog box 51 and receive user's print settings.

An API module 32 may be for implementing an API for the OS 17 to access the printer driver 20.

A color printing module 33 is configured to perform multiple-color printing. The color printing module 33 performs, but is not limited to for example, color conversion processing, for multiple-color printing. A monochrome printing module 34 is configured for monochrome printing. The monochrome printing module 34 performs, but is not limited to, for example, color conversion processing, for monochrome printing.

A single-sided printing module 35 is configured (is for) for single-sided printing. A double-sided printing module 36 is configured for double-sided printing.

A scaling module 37 may be for scaling up or down an image included in a page to be printed.

An "N in 1", i.e., "pages per sheet", printing module 38 may be for performing "N in 1" printing in which a plurality of N pages may be allocated on one (1) side of a sheet for printing, where N is an integer.

A poster printing module 39 may be for performing poster or tiled printing in which a plurality of pages may be printed to create one large print, i.e., a poster. More specifically, an image to be printed as a poster on one sheet may be divided into a plurality of sections. Each section may be printed on a single sheet and each printed sheet may be attached by a user to create a poster.

A security printing module 40 may be for security printing in which encrypted print data may be transmitted to the printer 3.

Modules of the printer driver 20 may not be limited to the above-described modules. Each printer driver 20 may comprise different modules. For example, when the printer 3 controlled by the printer driver 20 does not have a multiple-color printing function, the printer driver 20 may not comprise the color printing module 33.

(4) Processing of Driver Management Program

As depicted in FIG. 1, the driver management program 19 comprises a dummy driver 19a and a management program 19b.

The dummy driver 19a is a program which may be recognized as the printer driver 20 by the OS 17. In an aspect of the disclosure, the dummy driver 19a displays the print properties dialog box 51 and receives a print instruction from the OS 17, instead of the uninstalled printer driver 20. The dummy driver 19a displays the print properties dialog box 51, similar to the print properties dialog box displaying module 31, a function to provide an API to the OS 17, similar to the API module 32, and a function to exchange data with the management program 19b.

The management program 19b may be called from the OS 17 when the OS 17 is started up and may stay resident in the RAM 12 as a service or a daemon. The management program 19b may execute an uninstallation processing to uninstall the printer driver 20 and a printer driver management processing in which the management program 19b may download the relevant printer driver 20 from the server 2 and install the printer driver 20 in the PC 1 when the management program 19b receives a print instruction from the application 18, via a dummy driver 19. The management program 19b may start up the installed printer driver 20 to control the printer 3.

(4-1) Uninstallation Processing of Printer Driver

Figure 3:
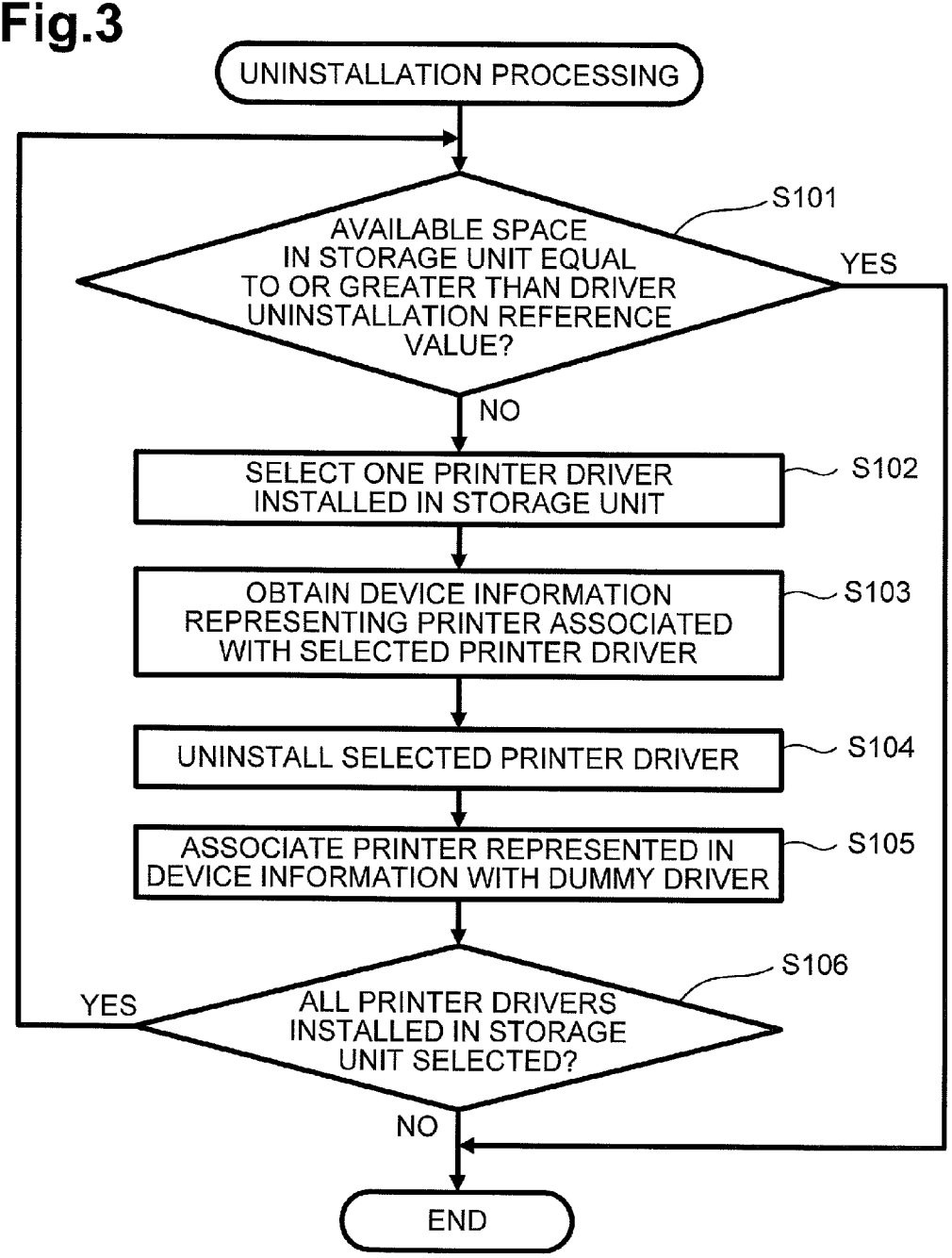
FIG. 3 is a flowchart depicting an uninstallation processing.

The uninstallation processing depicted in FIG. 3 to uninstall the printer driver 20 may be performed by the management program 19b regularly, for example, one time for every 10 minutes. The uninstallation processing may be performed with a user's instruction. In uninstallation processing, the management program 19b may be executed by the CPU 10.

In step S101, the management program 19b determines whether the available space in the storage unit 16 is equal to or greater than a driver uninstallation reference value. The driver uninstallation reference value represents the available space of the storage unit 16 and is used as a criterion to uninstall the printer driver 20 stored in the storage unit 16. Step S101 is an example of a step of monitoring an available space.

The driver uninstallation reference value may be set appropriately. The driver uninstallation reference value may be set by a user or set in the management program 19b as a fixed value.

When the management program 19b determines that the available space of the storage unit 16 is less than the driver uninstallation reference value, the management program 19b proceeds to step S102. When the management program 19b determines that the available space of the storage unit 16 is equal to or greater than the driver uninstallation reference value, the management program 19b ends the uninstallation processing.

In step S102, the management program 19b determines the printer drivers 20 installed in the storage unit 16 and selects one printer driver 20 installed in the storage unit 16. For example, the management program 19b select the printer driver 20 that may not be installed by the management program 19b, i.e., the printer driver 20 that may operate by itself as a driver program. Step S102 is an example of a step of determining a driver program. When step S102 is executed twice or more, the management program 19b may select another printer driver 20 that has not yet been selected.

The management program 19b determines the printer drivers 20 installed in the storage unit 16, for example, by obtaining information of the printer drivers 20 installed in the storage unit 16 from the OS 17. In as aspect of the disclosure the sequence that the printer drivers 20 are selected may be determined based on the start-up time. More specifically, for example, the time when the printer driver 20 is started up may be obtained. The printer driver 20 that has never been started up or the printer driver 20 whose start-up time is the oldest may be selected. The printer drivers 20 may be selected in the ascending order of frequency that the printer drivers 20 are started up, i.e., the printer driver 20 that is least frequently started up may be selected first.

In step S103, the management program 19b obtains from the OS 17 device information representing the printer 3 associated with the printer driver 20 selected in step S102. The device information may comprise, for example, a name and an IP address of the printer 3. Step S103 is an example of a step of obtaining device information.

In step S104, the management program 19b uninstalls the printer driver 20 selected in step S102. Step S104 is an example of a step of uninstalling.

In step S105, the management program 19b associates the printer 3 represented in the device information obtained in step S103, i.e., the printer 3 associated with the printer driver 20 uninstalled in step S104, with the dummy driver 19a. For example, the management program 19b instructs the OS 17 to associate the printer 3 with the dummy driver 19a, via the API provided by the OS 17. A plurality of different printers 3 may be associated with the dummy driver 19a. Step S105 is an example of a step of associating.

In step S106, the management program 19b determines whether all printer drivers 20 installed in the storage unit 16 are selected. When the management program 19b determines that all printer drivers 20 installed in the storage unit 16 are selected, the management program 19b ends the uninstallation processing. When the management program 19b determines that all printer drivers 20 installed in the storage unit 16 are not selected, the management program 19b returns to step S101 and repeats steps S101-106.

(4-2) Print Properties Dialog Box Displayed by the Dummy Driver

Figure 4:
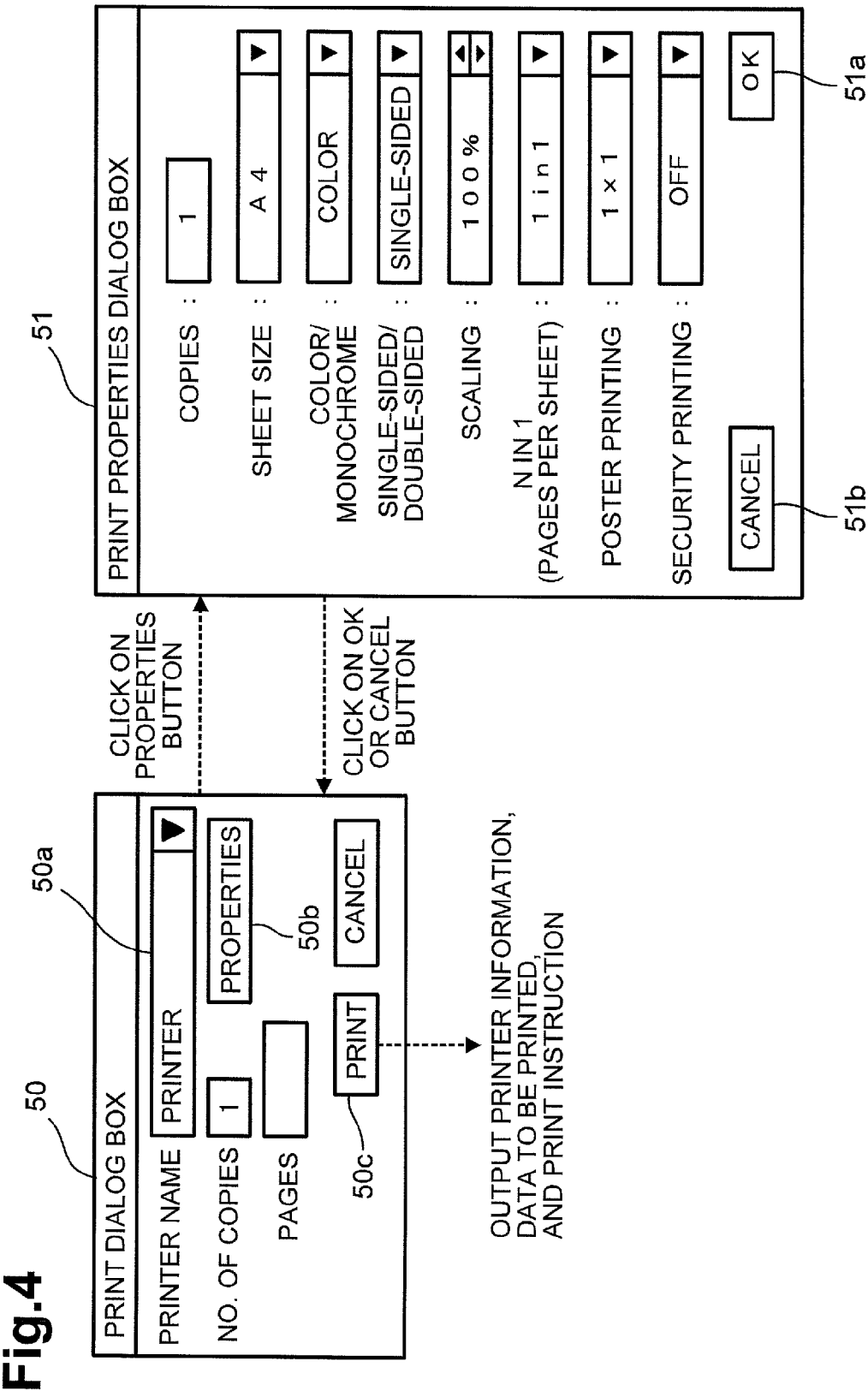
FIG. 4 is a diagram depicting examples of a print dialog box and a print properties dialog box.

FIG. 4 depicts a print dialog box 50 displayed by the application 18 and the print properties dialog box 51 displayed by the dummy driver 19a.

In the print dialog box 50, a pull-down menu 50a may be displayed to select the printer 3 that may execute printing. The pull-down menu 50a may display names of the printers 3 associated with the printer drivers 20 installed in the storage unit 16. In an aspect of the disclosure, a dummy driver 19a is associated with the printer 3 which is associated with the printer driver 20 uninstalled in step S104. Therefore, the OS 17 may recognize the dummy driver 19a as the printer driver 20. Consequently, the name of the printer 3 associated with the dummy driver 19a may be displayed in the pull-down menu 50a.

A user may select the printer 3 in the print dialog box 50 and may click on a properties button 50b to provide an instruction to the printer driver 20, which may control the selected printer 3, to display the print properties dialog box 51. For example, a user may click on the properties button 50b while the printer 3 associated with the dummy driver 19a is selected. As the properties button 50b is clicked while the printer 3 associated with the dummy driver 19a is selected, the application 18 outputs an instruction to the dummy driver 19a, via the OS 17, to display the print properties dialog box 51. The dummy driver 19a to which an instruction to display the print properties dialog box 51 is output, displays the print properties dialog box 51 in the display unit 13.

In the print properties dialog box 51 depicted in FIG. 4, a user may change print settings in each field, e.g., the number of copies, sheet size, color/monochrome printing, single-sided/double-sided printing, scaling, "N in 1" (pages per sheet) printing, the poster (tiled) printing, and security printing. The fields of the print properties dialog box 51 in which settings can be changed may differ according to the printer driver 20 controlling the selected printer 3. For example, in a case where the printer driver 20 does not comprise the "N in 1" printing module 38 or the poster printing module 39, the "N in 1" printing and the poster printing fields in the print properties dialog box 51 may be grayed out or may not be displayed.

When a user clicks on an OK button 51a or a cancel button 51b in the print properties dialog box 51, the print properties dialog box 51 may be closed and the user may go back to the print dialog box 50. When the user clicks on the OK button 51a, the dummy driver 19a writes settings made in the print properties dialog box 51 in a predetermined area of the RAM 12 as print settings. Then, the dummy driver 19a may close the print properties dialog box 51. When a user clicks on the cancel button 51b, the dummy driver 19a may close the print properties dialog box 51 without writing settings made in the print properties dialog box 51 in the predetermined area of the RAM 12.

When a user clicks on a print button 50c in the print dialog box 50, the application 18 outputs printer information representing the printer 3 selected by the user and data of one or more pages to be printed to the dummy driver 19a. The application 18 may also output a print instruction to print the data to be printed by the printer 3 represented in the printer information, to the dummy driver 19a.

The print setting may be an example of a processing condition. A processing of the dummy driver's 19a displaying the print properties dialog box 51 and receiving the print settings may be an example of a step of receiving a processing condition.

(4-3) Printer Driver Management Processing

Figure 5:
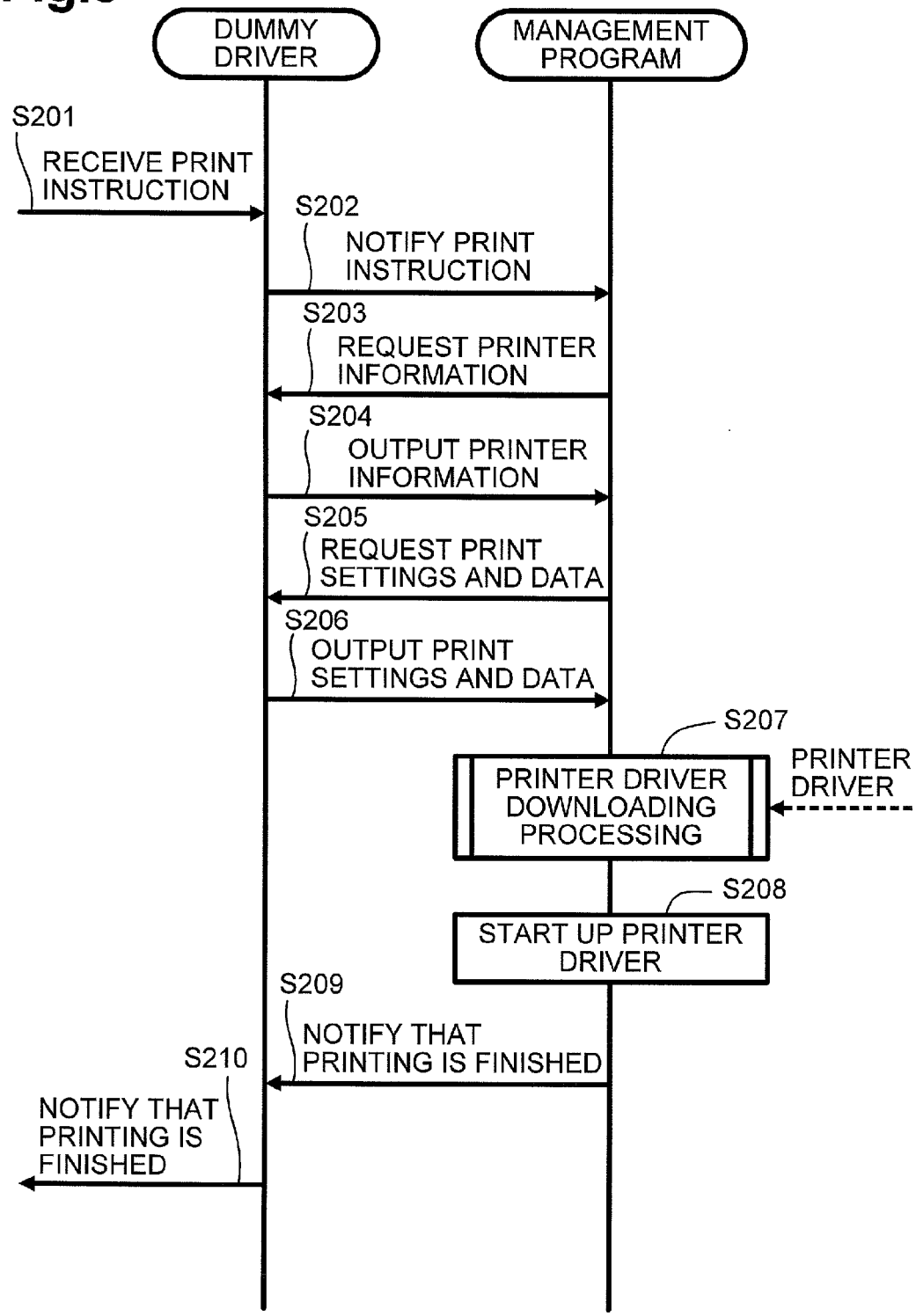
FIG. 5 is a sequence diagram depicting sequences in a printer driver management processing.

In the printer driver management processing depicted in FIG. 5, the CPU 10 executes the dummy driver 19a and the management program 19b.

In step S201, the dummy driver 19a receives a print instruction output from the application 18 via the OS 17. Step S201 is an example of a step of receiving an instruction.

In step S202, the dummy driver 19a notifies the management program 19b that a print instruction is output from the application 18.

In step S203, the management program 19b requests the dummy driver 19a to output the printer information.

In step S204, the dummy driver 19a outputs the printer information output from the application 18 to the management program 19b.

In step S205, the management program 19b requests the dummy driver 19a to output the print settings and data to be printed.

In step S206, the dummy driver 19a outputs to the management program 19b the print settings written in the predetermined area of the RAM 12 and data to be printed, which may be output from the application 18.

In step S207, the management program 19*b* executes a printer driver downloading processing. In the printer driver downloading processing, when the printer driver 20 controlling the printer 3 represented in the printer information is not installed in the storage unit 16, the management program 19*b* may be download the printer driver 20 from the server 2 to install the printer driver 20 in the storage unit 16. The printer driver downloading processing is an example of a step of downloading and installing.

In the printer driver downloading processing, the print properties dialog box displaying module 31 and the API module 32 may not be downloaded. The dummy driver 19*a* may have functions to display the print properties dialog box 51 and to provide an API to the OS 17, so that it may be unnecessary to download the modules 31, 32.

In step S208, the management program 19*b* starts up the printer driver 20 that controls the printer 3 represented in the printer information, and outputs to the printer driver 20 the printer information, the print settings, and the data to be printed, which may be output from the dummy driver 19*a*. Step S208 is an example of a step of starting up a driver program.

The printer driver 20 that is started up may generate print data based on the print settings and the data to be printed. The printer driver 20 controls the printer 3 represented in the printer information to print the print data.

In step S209, the management program 19*b* notifies the dummy driver 19*a* that printing is finished.

In step S210, the dummy driver 19*a* notifies the application 18 that printing is finished.

(4-4) Printer Driver Downloading Processing

Figure 6:
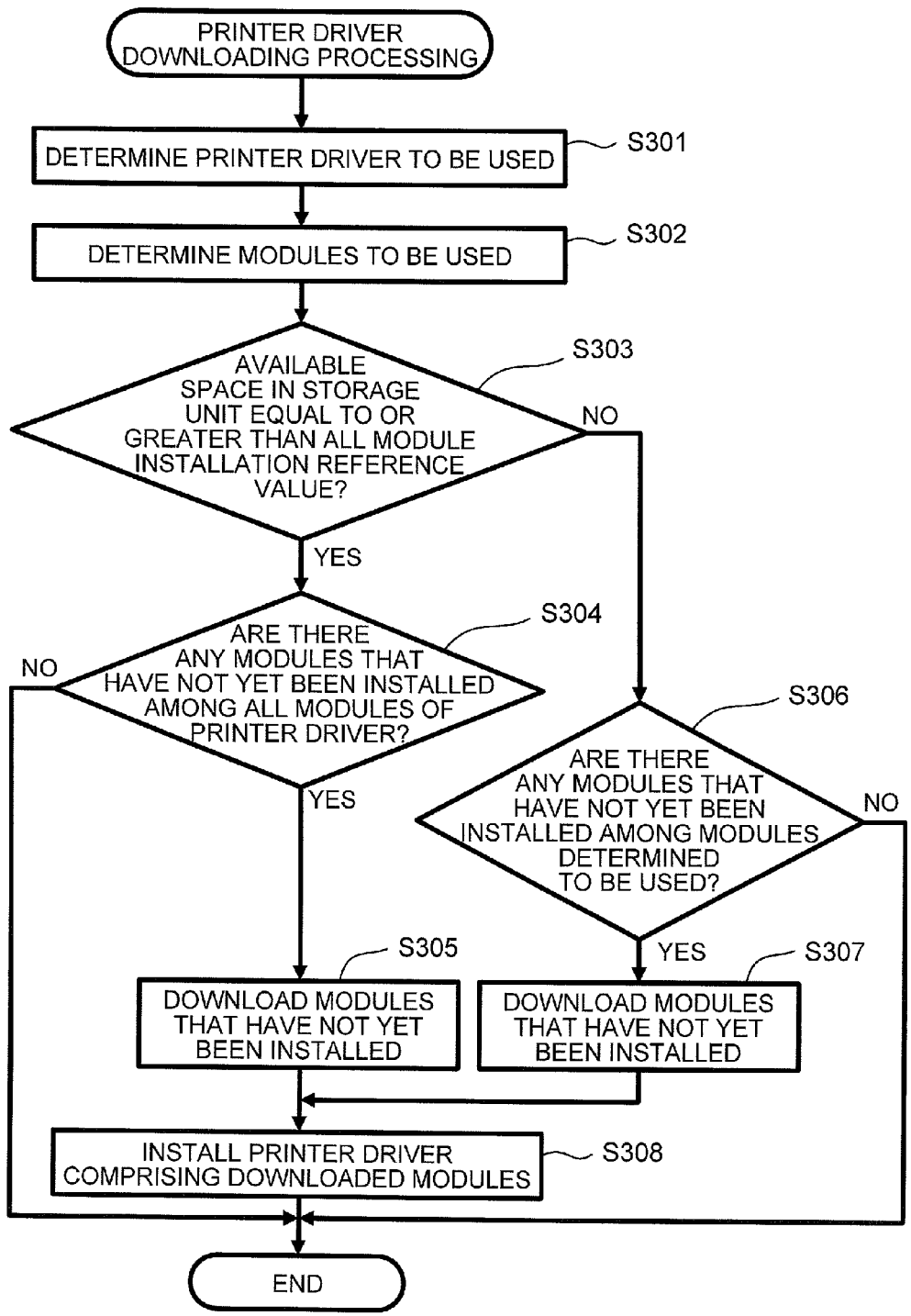
FIG. 6 is a flowchart depicting a printer driver downloading processing.

FIG. 6 depicts the flow of the printer driver downloading processing that may be performed in step S207.

In step S301, the management program 19*b* determines the printer driver 20 that is to be used to control the printer 3 represented in the printer information output from the dummy driver 19*a*. More specifically, the storage unit 16 may store therein, for example, a table showing the relationship between the printer 3 and the printer driver 20 used for controlling the printer 3. The management program 19*b* may refer to the table to determine the printer driver 20.

In step S302, the management program 19*b* determines the modules to be used based on the print settings output from the dummy driver 19*a*.

For example, the output print settings may be as follows:
   Color/monochrome printing=color
   Single-sided/double-sided printing=single-sided
   Scaling=100%
   "N in 1" printing (pages per sheet)=2 in 1 (2 pages per sheet)
   Poster printing=No
   Security printing=Yes In this case, the management program 19*b* determines that the color printing module 33, the single-sided printing module 35, the "N in 1" printing module 38, and the security printing module 40 are to be used.

In step S303, the management program 19*b* determines whether the available space in the storage unit 16 is equal to or greater than an all module installation reference value. The all module installation reference value represents the available space of the storage unit 16 required to store in the storage unit 16 all modules of the printer driver 20 to be used. The all module installation reference value may be set appropriately. A user may set the all module installation reference value, or the all module installation reference value may be set in the management program 19*b* as a fixed value. A space required to store the printer driver 20 may be set according to the printer drivers 20 as the all module installation reference value.

When the management program 19*b* determines that the available space in the storage unit 16 is equal to or greater than the all module installation reference value, the management program 19*b* proceeds to step S304. When the management program 19*b* determines that the available space in the storage unit 16 is less than the all module installation reference value, the management program 19*b* proceeds to step S306.

In step S304, the management program 19*b* determines whether any modules of the printer driver 20 determined to be used in step S301 have not yet been installed. When the management program 19*b* determines that any modules of the printer driver 20 has not yet been installed in step S304, the management program 19*b* proceeds to step S305. When the management program 19*b* determines that all modules of the printer driver 20 have been installed in step S304, the management program 19*b* ends the printer driver downloading processing.

In step S305, the management program 19*b* downloads modules that have not yet been installed, among all modules of the printer driver 20 that is determined to be used in step S301. That is, in step S305, the management program 19*b* may download modules of the printer driver 20 determined to be used in step S301, regardless of whether modules are determined to be used in step S302.

In step S306, the management program 19*b* determines whether any modules have not yet been installed among the modules determined to be used in the step S302. When the management program 19*b* determines in step S306 that any modules have not yet been installed among the modules determined to be used in the step S302, the management program 19*b* proceeds to step S307. When the management program 19*b* determines in step S306 that all modules have been installed among the modules determined to be used in the step S302, the management program 19*b* ends the printer driver downloading processing.

In step S307, the management program 19*b* downloads all modules that have not yet been installed among the modules determined to be used in the step S302. That is, in step S307, among the modules of the printer driver 20 determined to be used in step S301, if any modules that have not yet been installed are determined to be used in step S302, the management program 19*b* downloads the modules, and does not download modules determined to be unused in the step S302.

In step S308, the management program 19*b* installs in the storage unit 16 the printer driver 20 comprising modules downloaded in step S305 or S307.

In the above embodiment, when the driver management program 19 receives an instruction to control the printer 3, the driver management program 19 downloads the printer driver 20 that may control the printer 3 and install the printer driver 20. When the printer driver 20 is downloaded from the server 2 and is installed in the PC 1, useless or waste processing of installing the printer driver 20 that will not be used and waste occupation or usage of the storage unit 16 may be reduced.

Further, when the driver management program 19 determines that the printer driver 20 is not installed, the driver management program 19 downloads the printer driver 20 from the server 2 and install the printer driver 20. When the driver management program 19 determines that the printer driver 20 has been already installed, the driver management program 19 does not download the printer driver 20. Therefore, such waste processing may be reduced that the printer driver 20 that has been already installed may be downloaded again and installed.

Further, the driver management program 19 may determine modules used for controlling the printer 3 based on the print settings. The driver management program 19 may download a module determined to be used for controlling the printer 3 and may install the module but may not download a module determined to be unused for controlling the printer 3 when available space in the storage unit 16 is less than the all module installation reference value. Therefore, waste processing of downloading and installing the modules that will not be used for controlling the printer 3 or waste occupation or usage of the storage unit 16 may be reduced.

Further, the driver management program 19 may determine, based on the print settings, which module, the color printing module 33 or the monochrome printing module 34 may be downloaded. Therefore, waste processing of installing a module that will not be used for controlling the printer 3 may be reduced.

Further, when the driver management program 19 determines that the available space of the storage unit 16 is equal to or greater than the all module installation reference value, the driver management program 19 may install all modules. Therefore, in the next and the subsequent controls of the printer 3, the time to start printing may be reduced as compared with the case where modules are downloaded and installed after a print instruction is output.

Further, in an aspect of the disclosure, when the driver management program 19 determines that the available space of the storage unit 16 is less than the driver uninstallation reference value, the driver management program 19 uninstalls the printer driver 20. Thus, the available space of the storage unit 16 may be increased when the available space of the storage unit 16 becomes small.

As described above, a user may select the printer 3 in the print dialog box 50. The printers 3 associated with the installed printer drivers 20 or the dummy driver 19a may be selectable with the pull-down menu 50a in the print dialog box 50. If the printer driver 20 is just uninstalled without use of the disclosed invention, a user may not be able to select the printer 3 controlled by the printer driver 20 in the print dialog box 50, so that an instruction to perform printing by the printer 3 may not be given. However, the driver management program 19 may associate the printer 3, which is associated with the uninstalled printer driver 20, with the dummy driver 19a. Therefore, even when the printer driver 20 is uninstalled, a user may be able to select the printer 3 associated with the uninstalled printer driver 20 in the print dialog box 50. That is, a user may provide an instruction to perform printing to the printer 3 associated with the uninstalled printer driver 20, after the printer driver 20 is uninstalled.

While the disclosure has been described in detail with reference to the specific embodiment thereof, it would be apparent to those skilled in the art that various changes, arrangements and modifications may be applied therein without departing from the spirit and scope of the disclosure.

In the above embodiment, the driver program may be the printer driver 20. However, the driver program may not be limited to the printer driver 20 but may be a scanner driver that may control an image scanner or a facsimile driver that may control a facsimile machine. Further, the driver program may be such a driver program that may control a multi-function device to perform a plurality of functions.

In the above embodiment, the image processing device may be the printer 3. However, the image processing device may not be limited to the printer 3 but may be a so-called multi-function device having, for example, a copying function, a scanning function, a facsimile transmission and reception function.

The dummy driver 19a may be associated with the scanner driver that may control the scanning function and the facsimile driver that may control the facsimile function, in addition to the printer driver 20.

A driver management program may determine which one of the driver, the printer driver 20, the scanner driver, or the facsimile driver is installed, based on the processing condition. More specifically, for example, the dummy driver 19a may let a user select any one of the copying function, the scanning function, and the facsimile function that may be executed. The dummy driver 19a may output to the management program 19b information representing the function selected by the user as a processing condition. The management program 19b may download a driver according to the function designated by the processing condition. Thus, modules used to control an unexecuted function may not be uselessly installed.

In the above embodiment, the management program 19b may execute the uninstallation processing. However, the uninstallation processing may not be necessarily executed by the management program 19b but other program may execute the uninstallation processing.

In the above embodiment, a plurality of the printers 3 may be associated with one dummy driver 19a. However, the dummy driver 19a may be provided for each printer 3.

In the above embodiment, even after the management program 19b installs the printer driver 20, the printer 3 controlled by the printer driver 20 may continued to be associated with the dummy driver 19a. In other words, even when the management program 19b installs the printer driver 20 after the printer driver 20 is uninstalled, the dummy driver 19a may continue to display the print properties dialog box 51 and provide an API to the OS 17.

However, when the management program 19b installs the printer driver 20, the printer 3 controlled by the printer driver 20 may be reassociated with the printer driver 20 from the dummy driver 19a. In this case, when the management program 19b install the printer driver 20, the print properties dialog box displaying module 31 and the API module 32 may be downloaded and installed. In a case where the printer 3 is reassociated with the printer driver 20, when a user gives a print instruction by selecting the printer 3 in the print dialog box 50, the OS 17 may provide the print instruction to the printer driver 20.

In the above embodiment, when the available space of the storage unit 16 is less than the driver uninstallation reference value, a selected printer driver 20 is uninstalled. However, the printer driver 20 installed by the management program 19b, i.e., the printer driver 20 that may not operate by itself as a driver program, may be uninstalled. In this case, the printer driver 20 may not be directly associated with the printer 3. Therefore, the printer 3 controlled by the printer driver 20 may be continued to be associated with the dummy driver 19a.

In the above embodiment, the information processor may be the PC 1. However, the information processor may not be limited to the PC 1 but may be a mobile phone or a personal digital assistant.

In the above embodiment, the printer drivers 20 may be provided according to models of the printers 3a-3d. However, the printer driver 20 may be a so-called universal printer driver configured to control a plurality of different types of the printers 3.

A technical advantage of the disclosure may be to reduce waste or useless processing of installing a driver program that will not be used when a driver program is installed by downloading the driver program from an external device.

While the disclosure has been described in detail with reference to the specific embodiment thereof, it would be apparent to those skilled in the art that various changes, arrangements and modifications may be applied therein without departing from the spirit and scope of the disclosure.

What is claimed is:

1. A non-transitory computer-readable storage medium storing a driver management program which can be executed by a processor of an information processing device, the information processing device being configured to be connected to an image processing device and an external device, the external device storing one or more driver programs, the one or more driver programs capable of being installed in the information processing device, each of the one or more driver programs being associated with one or more device information, wherein an application is installed in the information processing device, the application causing the processor to execute selecting a target image processing device from among one or more image processing devices, each of the one or more image processing devices are represented by one or more device information, the application further causing the processor to execute outputting target device information and target data to a target driver program, the target device information being device information representing the target image processing device, the target data being data to be image processed by the target image processing device, the target driver program is a driver program associated with the target device information, wherein the driver management program comprises a management driver and a management program, the management driver is installed in the information processing device, as one of the one or more driver programs, the management driver being associated with at least one image processing device, the application further causing the processor to display a print dialog interface having a list of the associated at least one image processing device, wherein the driver management program in a case where the management driver is selected as the target driver program, when executed by the processor, causes the processor to execute:

displaying, using the management driver, a print properties interface based on an instruction received from the application when the print dialog interface is displayed and a properties inquiry is received;

receiving print settings via the print properties interface;

storing, using the management driver, the print settings, wherein the management driver receives from the application, a print instruction and the target device information and outputs the target device information and print settings to the management program;

determining, when the target device information and the print settings are received by the management program, which one of the driver programs is a necessary driver program for the target image processing device selected by the processor from among the one or more driver programs, based on relation information and the target device information, the relation information showing a relationship between the one or more driver programs and the one or more image processing devices;

determining one or more modules which are to be used, based on the print settings, wherein the one or more modules are included in the necessary driver program;

downloading the one or more modules which are to be used to control the image processing device without downloading and installing other modules in the necessary driver program determined not to be used from the external device when the necessary driver program is not installed;

installing the downloaded one or more modules of the necessary driver program in the information processing device;

starting up the installed one or more modules of the necessary driver program; and outputting the target device information and the target data to the started one or more modules of the necessary driver program, wherein the started one or more modules of the necessary driver program generates print data to be processed based on the target data and controls the target image processing device selected by the processor to process the print data.

2. The non-transitory computer-readable storage medium according to claim 1, wherein the driver management program in a case where the management driver is selected as the target driver program, when executed by the processor, further causes the processor to execute:

determining whether the necessary driver program for controlling the target image processing device is installed in the information processing device; and installing the necessary driver program by downloading the one or more modules which are to be used to control the image processing device without downloading and installing other modules in the necessary driver program determined not to be used from the external device when it is determined that the necessary driver program is not installed.

3. The non-transitory computer-readable storage medium according to claim 1, wherein the target image processing device comprises a plurality of functions, and the driver management program in a case where the management driver is selected as the target driver program, when executed by the processor, further causes the processor to execute downloading the one or more modules which are to be used to control one or more of the plurality of functions executed by the target image processing device, based on the print settings.

4. The non-transitory computer-readable storage medium according to claim 1, wherein the target image processing device comprises an output device configured to output a processed image, the print settings represent that the image output by the target image processing device is multiple-color or monochrome, the necessary driver program comprises a conversion module for a multiple-color image and a conversion module for a monochrome image, and the driver management program in a case where the management driver is selected as the target driver program, when executed by the processor, further causes the processor to execute;

determining the conversion module which is to be used to convert the image by the target image processing device, based on the print settings; and downloading and installing the conversion module which is to be used to convert the image by the target image processing device without downloading and installing the other conversion module in the necessary driver program determined not to be used.

5. The non-transitory computer-readable storage medium according to claim 1, wherein the non-transitory computer-readable storage medium further storing an uninstallation program that, when executed by the processor coupled to a storage device configured to store a driver program, causes the processor to execute:
    determining whether an available space of the storage device is equal to or greater than a driver uninstallation reference value;
    selecting the driver program stored in the storage device when it is determined that the available space is less than the driver uninstallation reference value;
    obtaining device information representing an image processing device associated with the selected driver program;
    uninstalling the selected driver program; and
    associating the obtained device information with the management driver when the selected driver program is uninstalled.

6. The non-transitory computer-readable storage medium according to claim 1, wherein the driver management program, when executed by the processor coupled to a storage device configured to store a driver program, causes the processor to execute:
    determining whether an available space of the storage device is equal to or greater than a driver uninstallation reference value;
    selecting the driver program stored in the storage device when it is determined that the available space is less than the driver uninstallation reference value;
    obtaining device information representing an image processing device associated with the selected driver program;
    uninstalling the driver program; and
    associating the obtained device information with the management driver when the selected driver program is uninstalled.

7. The non-transitory computer-readable storage medium according to claim 6, wherein the storage device is further configured to store a plurality of driver programs, and wherein the driver management program, when executed by the processor, further causes the processor to execute monitoring a number of times each driver program is used for each of the plurality of driver programs stored in the storage device, wherein the selecting of the driver program is based on the number of times each driver program is used.

8. The non-transitory computer-readable storage medium according to claim 6, wherein the storage device is further configured to store a plurality of driver programs, and wherein the driver management program, when executed by the processor, further causes the processor to execute monitoring a time of last used for each of the plurality of driver programs stored in the storage device, wherein the selecting of the driver program is based on a time of last used of each driver program.

9. The non-transitory computer-readable storage medium according to claim 1, wherein the driver management program further causes the processor to execute:
    determining, when any one of the one or more driver programs is uninstalled, which one of the one or more device information is device information for the driver program being uninstalled, the determined device information is associated with the uninstalled driver program; and
    associating the determined device information with the management driver.

10. A non-transitory computer-readable storage medium storing a driver management program which can be executed by a processor of an information processing device, the information processing device being configured to be connected to an image processing device and an external device, the external device storing one or more driver programs, the one or more driver programs capable of being installed in the information processing device, each of the one or more driver programs being associated with one or more device information, wherein an application is installed in the information processing device, the application causing the processor to execute selecting a target image processing device from among one or more image processing devices, each of the one or more image processing devices are represented by one or more device information, the application further causing the processor to execute outputting target device information and target data to a target driver program, the target device information being device information representing the target image processing device, the target data being data to be image processed by the target image processing device, the target driver program is a driver program associated with the target device information, wherein the driver management program comprises a management driver and a management program, the management driver is installed in the information processing device, as one of the one or more driver programs, the management driver being associated with at least one image processing device, the application further causing the processor to display a print dialog interface having a list of the associated at least one image processing device, wherein the driver management program in a case where the management driver is selected as the target driver program, when executed by the processor, causes the processor to execute:
    displaying, using the management driver, a print properties interface based on an instruction received from the application when the print dialog interface is displayed and a properties inquiry is received;
    receiving print settings via the print properties interface;
    storing, using the management driver, the print settings,
    wherein the management driver receives from the application, a print instruction and the target device information and outputs the target device information and print settings to the management program;
    determining, when the target device information and the print settings are received by the management program, which one of the driver programs is a necessary driver program for the target image processing device selected by the processor from among the one or more driver programs, based on relation information and the target device information, the relation information showing a relationship between the one or more driver programs and the one or more image processing devices;
    determining whether an available space of a storage device of the information processing device is equal to or greater than a module installation reference value;
    determining one or more modules which are to be used, based on the print settings, wherein the one or more modules are included in the necessary driver program;
    downloading the one or more modules which are to be used to control the image processing device without downloading and installing other modules in the necessary driver program determined not to be used from the external device when the necessary driver program is not installed when it is determined that the available space of the storage device is less than the module installation reference value, installing the downloaded one or more modules of the necessary driver program in the information processing device, starting up the installed one or more modules of the necessary driver program; and outputting the target device information and the target data to the started one or more modules of the necessary driver program, wherein the started one or more modules of the necessary driver program generates print data to be processed based on the target data and controls the target image processing device selected by the processor to process the print data; and downloading all of the modules in the necessary driver program regardless of the print settings when it is determined that the available space of the storage device is equal to or greater than the module installation reference value, installing the downloaded modules of the necessary driver program in the information processing device, starting up the installed modules of the necessary driver program; and outputting the target device information and the target data to the started modules of the necessary driver program, wherein the started modules of the necessary driver program generates print data to be processed based on the target data and controls the target image processing device selected by the processor to process the print data.

11. An information processing device configured to be connected to an image processing device and an external device, the external device storing one or more driver programs, the one or more driver programs capable of being installed in the information processing device, each of the one or more driver programs being associated with one or more device information, the information processing device comprising:

a processor; and a storage device configured to store an application, one or more driver programs and a driver management program, the application causing the processor to execute selecting a target image processing device from among one or more image processing devices, each of the one or more image processing devices are represented by one or more device information, the application further causing the processor to execute outputting target device information and target data to a target driver program, the target device information being device information representing the target image processing device, the target data being data to be image processed by the target image processing device, the target driver program is a driver program associated with the target device information, wherein the driver management program comprises a management driver and a management program, the management driver is installed in the information processing device as one of the one or more driver programs, the management driver being associated with at least one image processing device, the application further causing the processor to display a print dialog interface having a list of the associated at least one image processing device;

the driver management program in a case where the management driver is selected as the target driver program, when executed by the processor, causes the processor to execute:

displaying, using the management driver, a print properties interface based on an instruction received from the application when the print dialog interface is displayed and a properties inquiry is received;

receiving print settings via the print properties interface;

storing, using the management driver, the print settings, wherein the management driver receives from the application, a print instruction and the target device information and outputs the target device information and print settings to the management program;

determining, when the target device information and the print settings are received by the management program which one of the driver programs is a necessary driver program for the target image processing device selected by the processor from among the one or more driver programs, based on relation information and the target device information, the relation information showing a relationship between the one or more driver programs and the one or more image processing devices;

determining one or more modules which are to be used, based on the print settings, wherein the one or more modules are included in the necessary driver program;

downloading the one or more modules which are to be used to control the image processing device without downloading and installing other modules in the necessary driver program determined not to be used from the external device when the necessary driver program is not installed;

installing the downloaded one or more modules of the necessary driver program in the information processing device;

starting up the installed one or more modules of the necessary driver program; and outputting the target device information and the target data to the started one or more modules of the necessary driver program, wherein the started one or more modules of the necessary driver program generates print data to be processed based on the target data and controls the target image processing device selected by the processor to process the print data.

12. The information processing device according to claim 11, wherein the processor is further configured to:

determine whether the necessary driver program for controlling the target image processing device is installed in the information processing device; and download and install the one or more modules which are to be used to control the image processing device without downloading and installing other modules in the necessary driver program determined not to be used from the external device when it is determined that the necessary driver program is not installed.

13. The information processing device according to claim 11, wherein the target image processing device comprises a plurality of functions and the processor is further configured to download the one or more modules which are to be used to control one or more of the plurality of functions executed by the target image processing device, based on the print settings.

14. The information processing device according to claim 11, wherein the target image processing device comprises an output device configured to output a processed image, the print settings represent that the image output by the target image processing device is multiple-color or monochrome, the necessary driver program comprises a conversion module for a multiple-color image and a conversion module for a monochrome image, and the processor further configured to:

determine the conversion modules which is to be used to convert the image by the target image processing device, based on the print settings;

download and install the conversion module which is to be used to convert the image by the target image processing device without downloading and installing the other conversion module in the necessary driver program determined not to be used.

15. The information processing device according to claim 11, wherein the processor further is configured to:

determine whether an available space of the storage device is equal to or greater than a driver uninstallation reference value;

select a driver program from among the one or more driver programs stored in the storage device when it is determined that the available space is less than the driver uninstallation reference value;

obtain device information representing an image processing device associated with the selected driver program;

uninstall the selected driver program; and associate the obtained device information with the management driver when the selected driver program is uninstalled.

16. An information processing device configured to be connected to an image processing device and an external device, the external device storing one or more driver programs, the one or more driver programs capable of being installed in the information processing device, each of the one or more driver programs being associated with one or more device information, the information processing device comprising:

a processor; and a storage device configured to store an application, one or more driver programs and a driver management program, the application causing the processor to execute selecting a target image processing device from among one or more image processing devices, each of the one or more image processing devices are represented by one or more device information, the application further causing the processor to execute outputting target device information and target data to a target driver program, the target device information being device information representing the target image processing device, the target data being data to be image processed by the target image processing device, the target driver program is a driver program associated with the target device information, wherein the driver management program comprises a management driver and a management program, the management driver is installed in the information processing device as one of the one or more driver programs, the management driver being associated with at least one image processing device, the application further causing the processor to display a print dialog interface having a list of the associated at least one image processing device;

the driver management program in a case where the management driver is selected as the target driver program, when executed by the processor, causes the processor to execute:

displaying, using the management driver, a print properties interface based on an instruction received from the application when the print dialog interface is displayed and a properties inquiry is received;

receiving print settings via the print properties interface;

storing, using the management driver, the print settings, wherein the management driver receives from the application, a print instruction and the target device information and outputs the target device information and print settings to the management program;

determining, when the target device information and the print settings are received by the management program, which one of the driver programs is a necessary driver program for the target image processing device selected by the processor from among the one or more driver programs, based on relation information and the target device information, the relation information showing a relationship between the one or more driver programs and the one or more image processing devices;

determine whether an available space of the storage device is less than a module installation reference value;

determine one or more modules which are to be used, based on the print settings, wherein the one or more modules are included in the necessary driver program;

downloading the one or more modules which are to be used to control the image processing device without downloading and installing other modules in the necessary driver program determined not to be used from the external device when the necessary driver program is not installed, when it is determined that the available space of the storage device is less than the module installation reference value, installing the downloaded one or more modules of the necessary driver program in the information processing device, starting up the installed one or more modules of the necessary driver program; and outputting the target device information and the target data to the started one or more modules of the necessary driver program, wherein the started one or more modules of the necessary driver program generates print data to be processed based on the target data and controls the target image processing device selected by the processor to process the print data; and downloading all of the modules in the necessary driver program regardless of the print settings when it is determined that the available space of the storage device is equal to or greater than the module installation reference value, installing the downloaded modules of the necessary driver program in the information processing device, starting up the installed modules of the necessary driver program; and outputting the target device information and the target data to the started modules of the necessary driver program, wherein the started modules of the necessary driver program generates print data to be processed based on the target data and controls the target image processing device selected by the processor to process the print data.

* * * * *